Figure 1:
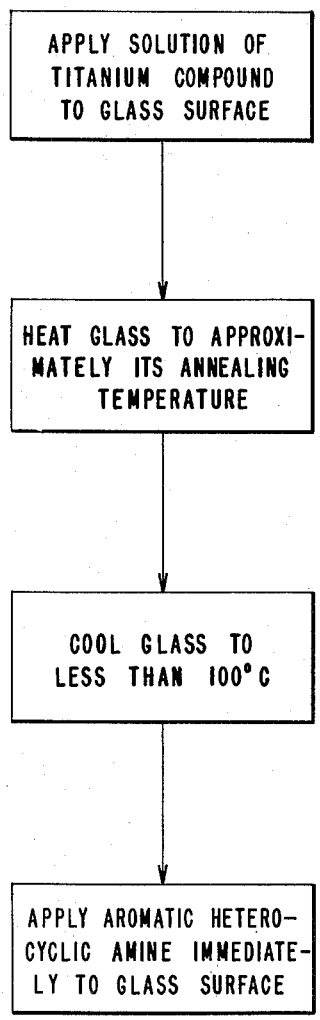

United States Patent Office 3,161,531
Patented Dec. 15, 1964

---

3,161,531
PROCESS FOR INCREASING THE SCRATCH RESISTANCE OF GLASS
Robert Harold Dettre, Brandywine Hundred, and Jerry Allen Nelson, Newark, Del., assignors to E. I. du Pont de Nemours and Company, Wilmington, Del., a corporation of Delaware
Filed Dec. 22, 1961, Ser. No. 161,417
3 Claims. (Cl. 117—62)

This invention relates to an improved process for increasing the scratch resistance of glass bodies.

The problem and importance of scratch resistance in glass are discussed in detail by Deyrup in U.S.P. 2,831,780. It is a practical industrial problem and relates to such items as the weakening of glass bottles by rubbing against each other in transit, the marring of window glass through scratches by impinging dust or glass fragments, and the weakening of textile glass fibers by mutual abrasion.

In said patent, Deyrup offers a method for overcoming this deficiency of glass by treating the same with the vapors of a metallo-organic compound at a temperature between the lowest annealing temperature of glass and the temperature at which excessive deformation occurs.

In copending application Serial No. 58,616 (now U.S. Patent 3,051,593) and U.S. Patent No. 3,004,863 of C. L. Gray and R. H. Dettre, processes are described and claimed wherein glass articles are treated with an aqueous solution of certain water-soluble and water-stable ester derivatives of titanium, following which the glass articles are passed through an annealing oven wherein they are heated to a temperature at or near the annealing point, and then allowed to cool to essentially room temperature. Still a third type of titanium compounds is employed in copending application of Brockett, Dettre and Gray, Serial No. 97,757.

All these processes have the one feature in common that a titanium oxide film is eventually formed in contact with the glass surface which is probably bonded, partially or completely, with the material of the glass through Ti—O—Si links.

As a final step, however, in all the aforegoing processes the articles must be allowed to stand in open air for a period not less than 20 or 30 minutes. Until after this standing period in air, the scratch resistance effect does not seem to develop fully. And although Deyrup has not recognized or taught it in his patent, a standing period in air is essential in his process, too, if a complete and reliable development of the scratch resistant effect is desired.

As has been pointed out in U.S. Patent 3,051,593, the standing in open air for 20 minutes before use is apt to occur automatically with almost any glass article. Nevertheless, the standing step takes on a positive aspect, often with uneconomical side features, when one considers belt line production of articles such as milk bottles. The standing step demands that the belt line be held still for 20 minutes or more so as not to give the bottles a chance to scratch each other in motion before their scratch-resistant coating has become fixed. Where the article produced must be of relatively small cost, such holding up period becomes a matter of material economic significance.

Furthermore, the required length of the standing period may vary from one treatment to another (depending on the type of titanium compound selected for the treatment and perhaps also on the temperature and mode of application of the annealing treatment) and therefore often presents problems in control of the process, inasmuch as one cannot readily determine by mere inspection of the articles whether they have or have not received the proper length of air-curing.

It is accordingly an object of this invention to modify the aforementioned processes of imparting scratch resistance of glass bodies, whereby to eliminate the need of holding the treated bodies still in air for a determined period of time after annealing, and to substitute therefor a positive chemical treatment. Other objects and achievements of this invention will become apparent as the description proceeds.

Now, according to our present invention, the curing period is replaced by a treatment with certain chemical agents as defined below, which treatment can be achieved quickly by immersion, spraying or otherwise coating the annealed glass article with an aqueous solution of said chemical agents.

Reference is made to the attached drawing which illustrates by a flow sheet diagram the process of the present invention.

Figure 2:
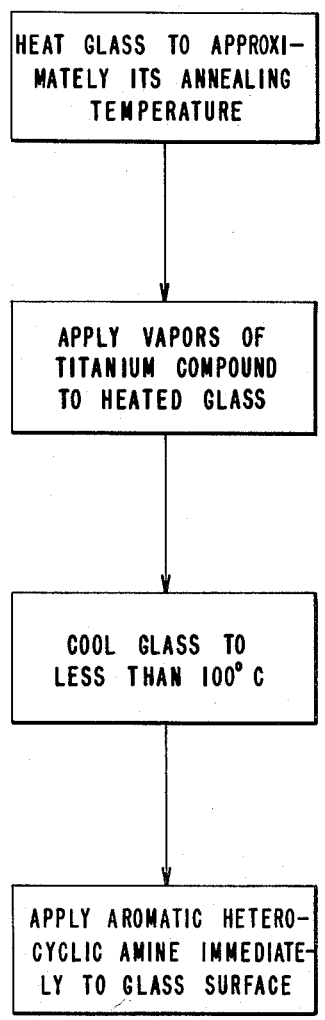

FIGS. 1 and 2 are alternative processes which differ only with respect to the manner of applying the titanium organic compound. In FIG. 1, a solution of the titanium compound is applied to the glass prior to heating; whereas, in the alternative process of FIG. 2, vapors of a titanium compound are applied to the heated glass. The last two steps in the processes of both FIGS. 1 and 2 are the same.

We have found that glass articles which have been treated with organic titanium compounds and annealed according to said patents or said copending application become satisfactorily scratch resistant if the annealing is followed up with a step of treating said articles with an aqueous solution of a water-soluble heterocyclic nitrogen compound having one or more long-chain, saturated aliphatic radicals in its molecule, which chain may be attached to the N-atom, to a nuclear C-atom, or to the N-atom or O-atom of a side-chain aminoalkyl or oxyalkyl substituent borne by the heterocyclic nucleus. In other words, the agent usable according to this invention may be the salt form or quaternary derivative of a compound defined by the formula

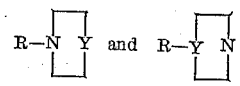

wherein R is a straight or branched chain aliphatic radical of 12 to 22 C-atoms which possesses at least 12 C-atoms in a continuous hydrocarbon chain, and Y represents a group of atoms required to complete with N an aromatic-type heterocyclic ring.

As convenient specific illustrations of the aforegoing heteronuclear rings (in base form) may be mentioned: pyridine, pyrimidine, pyrazine, pyridazine, quinoline and their various C-alkyl substituents, while the long-chain radical R may be illustrated by dodecyl, tetradecyl, etc., up to and including docosyl.

Where the agent selected is of the C-alkyl type, the long-chain radical R may be located in a nuclear C-atom or on a side-chain N or O-atom. Illustrations of such compounds are 2-octadecyl-pyridine hydrochloride,

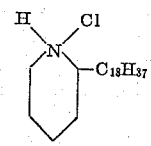

1-methyl-2-hexadecylamino-pyridinium chloride,

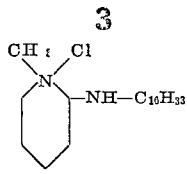

4-hexadecyl-pyridine sulfate,

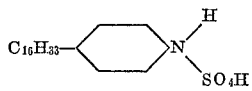

and 1-methyl-2-(2-octadecyl-oxyethyl)pyridinium chloride,

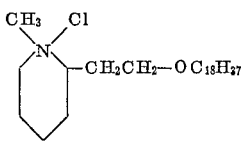

It will be noted that in such cases, the nuclear N-atom (or one of them in the case of the diazines) is either in the form of a salt (with an acid such as hydrochloric, hydrobromic, sulfuric, phosphoric or acetic), or in a quaternary form, as obtained by reacting the base form of said heterocyclic compound with any conveniently available quaternizing agent, for instance dimethyl sulfate, methyl or ethyl chloride, methyl or ethyl bromide, methyl or ethyl iodide, methyl-p-toluene sulfonate, benzyl chloride, and the like.

In another form of this invention, the long-chain alkyl radical R itself may be attached to the nuclear N-atom, as illustrated by Cetyl pyridinium chloride or bromide (which may be obtained by reacting pyridine with cetyl chloride or bromide, respectively),
Tetradecyl pyrazinium chloride (from pyrazine and tetradecyl chloride),
Octadecyl quinolinium chloride (from quinoline and octadecyl chloride),
Cetyl picolinium chloride (from picoline and cetyl chloride),
The quaternary compounds obtained by reacting quinaldine with cetyl chloride, cetyl bromide, tetradecyl chloride, etc., and
Compounds typified by N-(2-octadecyloxyethyl)pyridinium chloride,

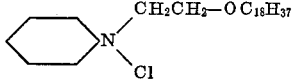

(obtained by reacting octadecyl alcohol with ethylene oxide to give beta-octadecyloxyethanol, reacting this alcohol with thionyl chloride to obtain beta-octadecyloxyethyl chloride and then reacting this chloride with pyridine).

Without any intent to limit this invention, the following example is given to illustrate our preferred procedure. Percentages mentioned are by weight.

Example

Following the procedure of U.S. Patent 3,051,593 to Gray and Dettre, glass bottles are dipped into a 10% aqueous solution of triethanolamine titanate (prepared according to Bostwick, U.S.P. 2,824,114) and the excess solution is allowed to drain from the surface. Alternatively, the solution may be applied to the glass surface as a fine spray. The wetted bottles are then slowly heated to 650° C. in an annealing lehr and then cooled slowly to near ambient temperature. On issuing from the lehr, the bottles are dipped into (or sprayed with) a 1% aqueous solution of N-hexadecyl-pyridinium chloride and allowed to drain. The bottles thus obtained are immediately scratch resistant as may be demonstrated by rubbing two such bottles together with no apparent effect. (If two bottles are rubbed together immediately after leaving the lehr but before treating with the amine solution, they scratch each other readily.)

Similar results are obtained if the hexadecyl-pyridinium chloride in the above example is replaced by any one of the other long-chain substituted heterocyclic compounds hereinabove named.

In the above examples, the treatment prior to annealing was done with triethanolamine titanate, in accordance with U.S. Patent 3,051,593 to Gray and Dettre. Equally successful results are obtained if this treatment is done with an aqueous solution of diisopropyl diacetoacetonyl titanate (as in the Gray and Dettre patent, No. 3,004,638), or with an aqueous solution of a water-soluble titanium lactate complex (as in copending application of Brockett, Dettre and Gray, Serial No. 97,757), or with vapors of tetraisopropyl titanate (as in Deyrup, U.S.P. 2,831,780), or again if the bottles are dipped in or sprayed with heptane solutions of dihydroxy-bis(2-ethyl-1,3-hexanediol) titanate, poly(dibutyl titanate) or tetrakis(2-ethyl-1,3-hexanediol)titanate and then heated to the annealing temperature as taught in the above mentioned references. None of these methods produce glass surfaces which are scratch resistant immediately on leaving the annealing lehr but they become so on treatment according to this invention.

As an added advantage of the treatment constituting this invention, it has been found that glass articles produced by the present process are more scratch resistant than those produced by the methods of the aforementioned patents and copending application, even though the air-curing step above described has been applied to the titanium-treated glass.

The resistance to scratching of a glass surface can be measured by drawing a glass rod across the surface and measuring the weight or tension which must be applied to the rod to produce a scratch. In this manner, the higher scratch resistance produced by the present process can be readily demonstrated.

Treatment with the special agents of this invention of a glass object which does not have a preformed titania coating with the compounds defined in the aforementioned patents or in said copending application, imparts to said glass objects a hydrophobic surface but not scratch resistance to any degree.

The scratch resistant glass surfaces produced according to the present invention are durable to washing with water, but not to washing with aqueous solutions of anionic detergents, such as the alkali metal salts of long chain alkyl sulfates or alkyl or alkaryl sulfonates. However, where an article has been washed with such a detergent, the scratch-resistant surface thereon can be reformed by treating the article again, in one of the aforegoing manners, with one of the nitrogenous agents mentioned in this specification. (In other words, the curing treatment is repeated on the washed article, but there is no need for repeating the treatment with a titanium ester or the annealing operation.)

It will be understood that the details of procedure above set forth may be varied widely within the skill of those engaged in this art.

For instance, the temperature to which the glass is allowed to cool in the annealing lehr need not drop below the temperature at which the curing treatment is intended to be applied, and may indeed be considerably higher so long as there is no danger of shattering the glass object by abrupt cooling during the curing treatment. Altogether the application of the curing treatment of this invention may vary in temperature from room temperature to 100° C., while the temperature of the glass just prior to the curing treatment may be some 50° C. higher than the temperature of the applied aqueous solution.

We claim as our invention:

1. In a process for increasing the scratch resistance of glass by applying an organo-titanium compound to the surface of the glass, which is in non-fibrous form, heating the glass, and then allowing the glass to stand in air for a period of not less than 20 minutes to develop the desired scratch resistance, the improvement which comprises eliminating the standing period required to develop scratch resistance by coating the surface of the glass, immediately after the heating step and at a temperature between room temperature and 100° C., with a nitrogenous compound selected from the group consisting of salts and quaternary derivatives of heterocyclic nitrogenous bases of the formula selected from the group consisting of

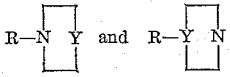

where R is a saturated aliphatic radical containing 12–22 carbon atoms and a continuous hydrocarbon chain of at least 12 carbon atoms, said continuous hydrocarbon chain being connected to Y through an atom selected from the group consisting of C-atoms, and N-atoms; and Y represents a group of atoms which in conjunction with the N-atom in the above formulae form a heterocyclic ring selected from the group consisting of pyridine, pyrimidine, pyrazine, pyridazine, and quinoline rings.

2. The process of claim 1 wherein the nitrogenous compound is N-hexadecyl-pyridinium chloride.

3. The process of claim 1 wherein the nitrogenous compound is applied to the glass from an aqueous solution of said compound.

References Cited in the file of this patent

UNITED STATES PATENTS

| | | |
|---|---|---|
| 2,563,289 | Steinman | Aug. 7, 1951 |
| 2,584,763 | Waggoner | Feb. 5, 1952 |
| 2,671,033 | Waggoner | Mar. 2, 1954 |
| 3,056,705 | Wong et al. | Oct. 2, 1962 |